United States Patent [19]

Ujihashi et al.

[11] Patent Number: 4,541,388
[45] Date of Patent: Sep. 17, 1985

[54] FUEL INJECTION TIMING CONTROL UNIT FOR AN ELECTRONIC CONTROLLED FUEL INJECTION APPARATUS MOUNTED ON AN INTERNAL COMBUSTION ENGINE

[75] Inventors: Michiaki Ujihashi, Mishima; Junichi Saiki, Susono, both of Japan

[73] Assignee: Toyota Jidosha Kabushiki Kaisha, Japan

[21] Appl. No.: 608,668

[22] Filed: May 10, 1984

[30] Foreign Application Priority Data

May 16, 1983 [JP] Japan .................................. 58-84255

[51] Int. Cl.$^4$ ............................................. F02M 51/00
[52] U.S. Cl. ...................................... 123/486; 123/490
[58] Field of Search ................. 123/478, 486, 490, 492

[56] References Cited

U.S. PATENT DOCUMENTS

| | | | |
|---|---|---|---|
| 3,890,938 | 6/1975 | Oishi et al. ...................... | 123/490 X |
| 4,213,425 | 7/1980 | Read ..................................... | 123/478 |
| 4,327,691 | 5/1982 | Moser ................................... | 123/478 |
| 4,387,429 | 6/1983 | Yamauchi et al. .............. | 123/478 X |

FOREIGN PATENT DOCUMENTS

| | | |
|---|---|---|
| 14178 | 4/1972 | Japan . |
| 41292 | 10/1972 | Japan . |
| 35428 | 11/1972 | Japan . |
| 51133 | 7/1973 | Japan . |
| 8622 | 1/1974 | Japan . |
| 40570 | 11/1974 | Japan . |

*Primary Examiner*—Tony M. Argenbright
*Attorney, Agent, or Firm*—Parkhurst & Oliff

[57] ABSTRACT

This invention relates to a fuel injection timing control unit for an electronic controlled fuel injection apparatus mounted on an internal combustion engine. The fuel injection timing of a fuel injection valve is first calculated and subsequently adjusted or modified due to an amount of throttle opening or an engine speed, thereby improving the engine response when a rapid acceleration of a vehicle is necessary.

8 Claims, 7 Drawing Figures

FUEL INJECTION TIMING CONTROL UNIT FOR AN ELECTRONIC CONTROLLED FUEL INJECTION APPARATUS MOUNTED ON AN INTERNAL COMBUSTION ENGINE

BACKGROUND OF THE INVENTION

The present invention relates to a fuel injection timing control unit for an electronic controlled fuel injection apparatus mounted on an internal combustion engine, and more particularly to a fuel injection timing control unit which enables a fuel injection timing to be adjustable.

In the electronic controlled fuel injection systems, there have been known three different types. One of the types is such an electronic controlled fuel injection system as a fuel is injected at the same time to all the cylinders of an engine. Another of the types is such an electronic controlled fuel injection system as a fuel is injected to a group of cylinders. The other of the types is such an electronic controlled fuel injection system as a fuel is separately injected to each of the cylinders in the condition that the fuel injection timing is synchronized with the induction stroke of each cylinder. According to the foregoing three types of an electronic controlled fuel injection systems, all the timing of injecting a fuel into a cylinder or cylinders is fixed. As the fuel injection timing is fixed, this impairs the response to an operator's demand that the acceleration of a vehicle is necessitated, in the transitional engine running condition. For example, in the engine running condition that a quick acceleration of a vehicle is necessitated. To obviate the foregoing drawback, the following two countermeasures are proposed. The first is, fuel is injected into the cylinders in the condition that the fuel injection timing is not synchronized with the induction stroke of the cylinders. The second is, an additional amount of a fuel is injected to the cylinders when the quick acceleration of a vehicle is necessitated. These countermeasures necessitate a complicated control. Further, the additional amount of a fuel to be injected is limited in order to reduce the amount of the exhaust gas, especially the components of HO and CO, discharged into the atmosphere. Hence, it is desirable to reduce the additional amount of injected fuel to be as little as possible.

SUMMARY OF THE INVENTION

The present invention was made in view of the foregoing background and to overcome the foregoing drawbacks. It is an object of this invention to provide a fuel injection timing control unit which enables a fuel injection timing to be adjustable, for an electronic controlled fuel injection apparatus mounted on an internal combustion engine.

To attain the above objects, a fuel injection timing control unit according to the present invention includes a means for detecting an engine speed, a means for measuring an amount of air introduced into the internal combustion engine, a means for detecting at least one parameter which indicates a driving condition of the engine, a first calculating means for calculating a fundamental duration of a fuel injection pulse from the amount of introduced air and the engine speed, a second calculating means for calculating an actual duration of the fuel injection pulse by compensating the fundamental duration of the fuel injection pulse calculated by the first calculating means, said compensating occurring due to said detected at least one parameter, a third calculating means for calculating a desired injection pulse commencement timing from the engine speed, the third calculating means means adopting the injection pulse duration as a parameter, a means for dividing a map of the desired injection pulse timing into multiple zones, a means for determining which zone the desired injection pulse commencement timing falls, and a means for setting a boundary value of the zone where the desired injection pulse commencement timing is contained, as an actual injection pulse commencement timing.

According to the fuel injection timing control unit of the present invention, it is not necessary to complicate the control unit and employ a large capacity memory in order to obtain an adjustable fuel injection timing.

The above objects, features and advantages of the present invention will become more apparent from the following description of the preferred embodiment taken in conjunction with the accompanying drawings.

DETAILED DESCRIPTION OF THE PREFERRED EMBODIMENT

The present invention is described in detail with reference to the accompanying drawings which illustrate an embodiment of the present invention.

Figure 1:
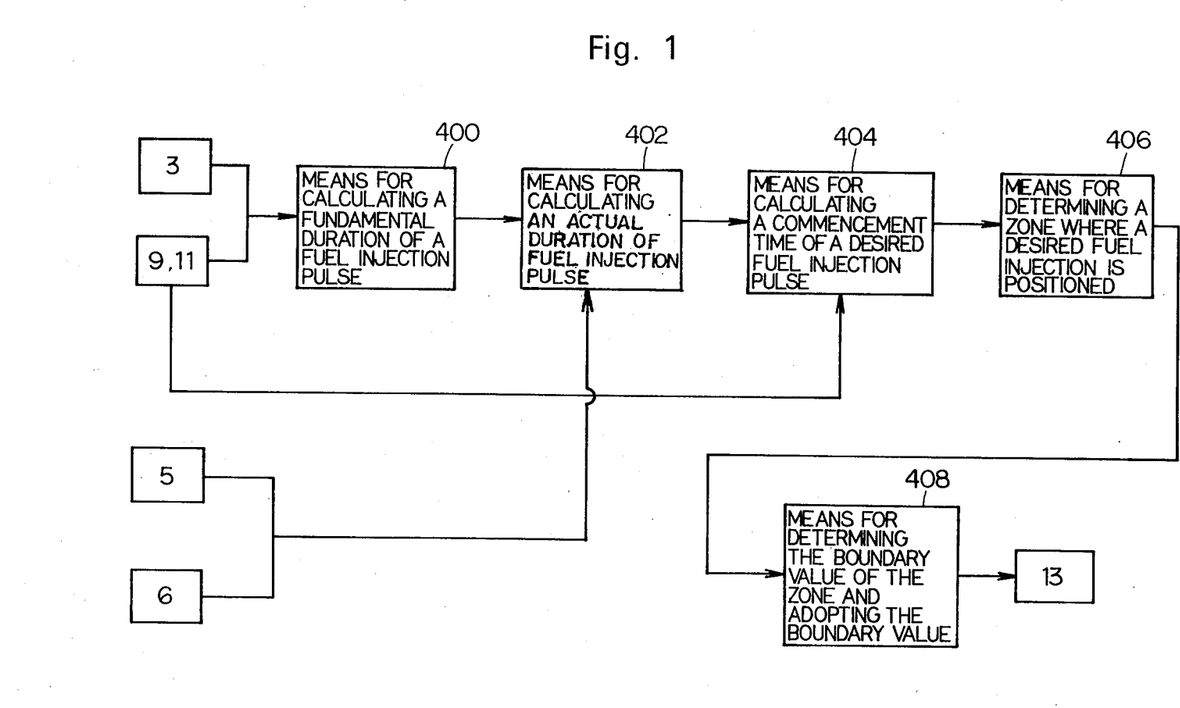
FIG. 1 is a block diagram of a unit according to the present invention.

FIG. 1 discloses a block diagram which is incorporated into the present invention. Means for detecting the volume of an intake air, for example, an air flow meter 3, is provided. Rotation angle sensors 9 and 11 are provided and are designed to detect the engine speed. The output signals of the air flow meter 3, the rotation angle sensors 9 and 11 are inputted to a first calculating means 400 for calculating a fundamental duration of a fuel injection pulse. The output signal of the means 400 is inputted to a second calculating means 402 for calculating an actual duration of a fuel injection pulse. A throttle sensor 5 is provided and is designed to detect an opening of a throttle valve 4. Further, an engine coolant temperature sensor 6 is provided and is designed to detect an engine coolant temperature. The output signals of the throttle sensor 5 and the engine coolant temperature sensor 6, are inputted to the second calculating means 402. In the second calculating means 402, the fundamental duration of a fuel injection pulse detected by the first calculating means 400 is compensated by the parameters (the throttle opening, the engine coolant temperature and so forth) detected by the sensors 5 and 6, thereby calculating an actual duration of the fuel injection pulse. The output signal of the means 402 is inputted to a means 404 for calculating a commencement time of a desired fuel injection pulse. The output signals of the rotation angle sensors 9 and 11 are inputted to the means 404. The output signal of the means 404 which designates a commencement time of a desired fuel injection pulse, is inputted to a determination means 406 for determining a zone where a desired fuel injection is positioned. The output signal of the means 406 is inputted to a means 408 which determines the boundary value of the zone and adopts the boundary value as the commencement time of a desired fuel injection pulse. The output signal of the means 408 is outputted to an electromagnetic fuel injection valve 13.

Figure 2:
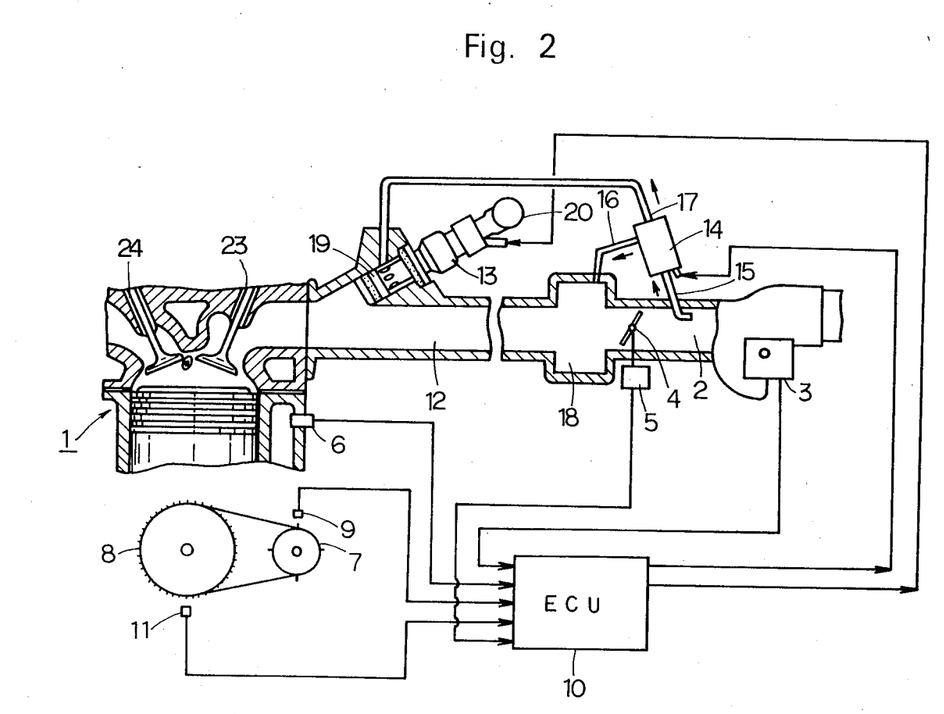
FIG. 2 is a partial cross-sectional view of an automobile equipped with a fuel injection timing control unit according to the present invention.

Referring next to FIG. 2, a partial cross-sectional view of an internal combustion engine equipped with the fuel injection timing control unit according to the present invention, is disclosed. An air flow meter 3 is provided in an intake passage 2 and is designed to calculate the amount of air introduced into an air-cleaner (not shown in drawings). The air flow meter 3, containing a potentiometer therein, generates an analog output signal which is proportional to the amount of introduced air. A throttle sensor 5 is secured to an intake manifold 12. The throttle sensor 5 detects the opening of the throttle valve 4, and generates an idling signal when the throttle valve 4 is fully closed and generates a full load signal when a full load is applied to an engine 1. The engine coolant temperature sensor 6 is mounted on a cylinder block of the engine 1 and detects the temperature of the engine coolant which is contained in an engine coolant jacket. The engine coolant temperature sensor 6 generates an analog output signal which is proportional to the engine coolant temperature. In an ignition distributor (not shown in drawings), there are provided a clock pulse generating rotation member 7 and a cylinder discriminating rotation member 8. The members 7 and 8 generate a pulse signal when the crank angle is 360° or 30°. The rotation angle sensors 9 and 11 are provided in order to detect the rotation angles of the rotation angle members 7 and 8, respectively. The rotation angle sensors 9 and 11 generate output pulse signals. The output pulse signals of the rotation angle sensors 9 and 11 are employed as a fundamental timing signal of the fuel injection, a fundamental timing signal of an engine ignition, a signal for demanding an interrupted calculation of the fuel injection, and a signal for demanding an interrupted calculation of the ignition timing. The electromagnetic fuel injection valve 13 is mounted on the intake manifold 12, and injects pressurized fuel, which is supplied from a fuel gallery 20, into the intake passage 2. A control valve 14 is designed to control the amount of the air which bypasses the throttle valve 4. When the engine coolant temperature is low, the air is introduced into the intake passage 2 and into the electromagnetic fuel injection valve 13. A part of the bypassed air is supplied to the electromagnetic fuel injection valve 13 to expedite the generation of vaporized fuel. The control valve 14 is communicated with the intake passage 2 through a pipe 15 which opens at the upstream intake passage of the throttle valve 4. Further, the control valve 14 is communicated through a pipe 16, which opens in a surge tank 18 provided in the downstream intake passage of the throttle valve 4. The control valve 14 is communicated through a pipe 17, which opens in an air injection adaptor 19 at one end thereof, provided adjacent to the electromagnetic injection valve 13. The numerals 23 and 24 designate an intake valve and an exhaust valve, respectively.

The output signals from the air flow meter 3, the engine coolant temperature sensor 6, the rotation angle sensors 9 and 11, and the throttle sensor 5, are inputted into an electronic control unit (hereinafter referred to as ECU) 10. After these output signals are calculated by the ECU 10, the output of the ECU 10 is fed into the fuel injection valve 13 and into the control valve 14.

Figure 3:
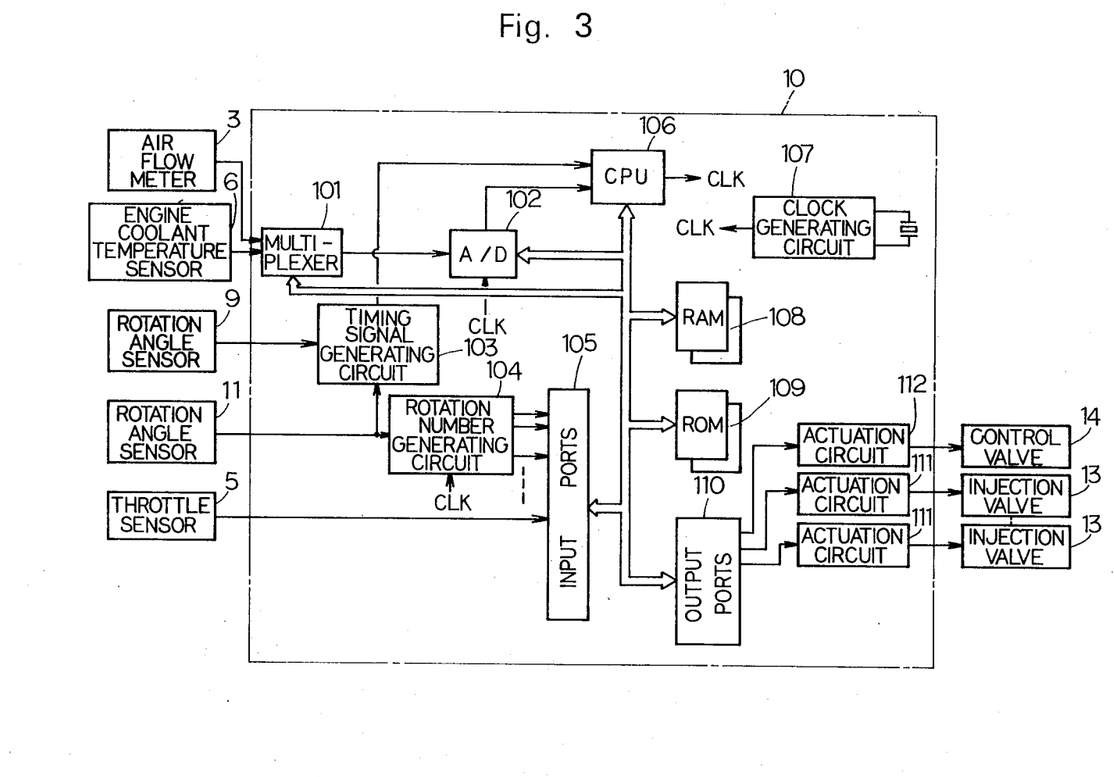
FIG. 3 is a circuit diagram of the electronic control unit illustrated in FIG. 2.

FIG. 3 indicates that the ECU 10 functions as a digital computer and comprises a multiplexer 101, an analog-digital converter (hereinafter referred to as A/D) 102, a timing signal generating circuit 103, a rotation number generating circuit 104, input ports 105, a central processing unit (hereinafter referred to as CPU) 106 which carries out the arithmetic and logic processing means, a clock generating circuit 107, a random-access memory (hereinafter referred to as RAM) 108 which temporarily stores the calculated data of the CPU 106, a read-only memory (hereinafter referred to as ROM) 109 which stores a predetermined control program and arithmetic constants therein, output ports 110, and actuation circuits 111 and 112.

The analog output signals of the air flow meter 3 and the engine coolant temperature sensor 6 are fed through the multiplexer 101 into the A/D 102. The multiplexer 101 is selectively controlled by the CPU 106. The A/D 102 converts the analog output signals of the air flow meter 3 and of the engine coolant temperature sensor 6 into the digital signals, by employing the clock signal (CLK) of the clock generating circuit 107. After the analog signals are converted by the A/D 102 to the digital signals, the A/D 102 feeds an interruption signal to the CPU 106. In the interruption routine, the latest data of the air flow meter 3 and of the engine coolant temperature sensor 6 are memorized in a predetermined area in the RAM 108, where the data can be read at an equal speed. The output pulse signals of the rotation angle sensors 9 and 11 are fed into the timing signal generating circuit 103, which generates an interruption signal and a fundamental timing signal. Further, the output pulse signal of the rotation angle sensor 11 is fed through the rotation number generating circuit 104 into the predetermined positions of the input ports 105. The rotation number generating circuit 104 receives the clock signal from the clock generating circuit 107, and generates a digital signal which is in inversely proportional to the engine speed. The output signal of the throttle sensor 5 is fed directly into a predetermined position of the input ports 105. The latest data of the engine speed RPM and of the engine coolant temperature are memorized in the predetermined area of the RAM 108, if necessary in the main routine, the sub routine, and the interruption routine. In the ROM 109, there are memorized programs of the main routine, the routine for calculating the commencement time of a fuel injection pulse, and a routine for carrying out a fuel injection, data, and constants which are employed in the programs. The CPU 106 controls the injection valve 13 and the actuation circuits 111 and 112 through output ports 110.

Figure 4:
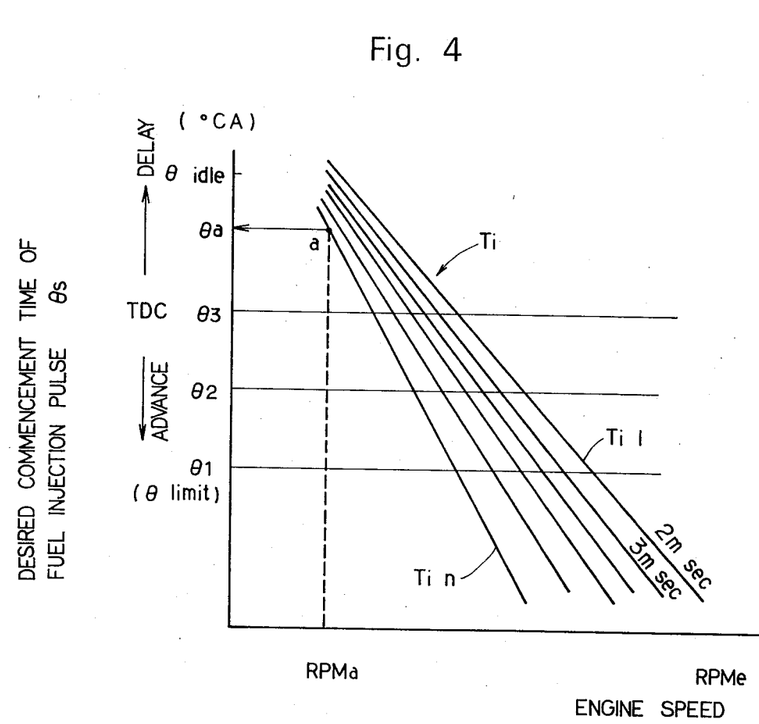
FIG. 4 is a graph illustrating a relation between a desired commencement time of a fuel injection pulse and an engine speed.

The commencement time of a fuel injection pulse is determined by the following procedure:

In FIG. 4, the abscissa represents an engine speed RPMe, and the ordinate represents a desired commencement time $\theta_s$ of a fuel injection pulse. The reference TDC in FIG. 4, designates $\theta_a$ top dead center. The zone in the ordinate, whose value is more than TDC, is a zone where a spark timing is delayed. The zone whose value is less than TDC in the ordinate, is a zone where a spark timing is advanced. In FIG. 4, a group of lines, which are defined by the following relation, are shown in the condition that a fuel injection pulse duration Ti ($i=1, 2, \ldots$) m sec are employed as a parameter.

$$\theta_s = 180 - \theta_c - 6 \cdot 10^{-3} \cdot RPMe(Ti + A + B) \quad (1)$$

where, $\theta_c$: a predetermined crank angle (° CA) at the point when a desired fuel injection is completely introduced.

A: a time period (m sec) taken from the completed time of a full injection pulse to a time when a fuel injection valve is actually closed.

B: a time period (m sec) taken a time when vaporized fuel is injected by a fuel injection valve to a time when the fuel is intaken into a combustion chamber of an engine.

The values of $\theta_c$ and B are constants determined by an engine. The constant A is determined by a fuel injection valve, based upon the results of experimentations or simulations. $\theta_1, \theta_2, \ldots \theta_n$ (For example, $n=3$) indicated on the ordinate in FIG. 4, are arbitrary timings when the actual fuel injection pulse is commenced. The whole zone $\theta_s$ of a desired injection pulse commencement time is divided into three zones, $\theta_1-\theta_2, \theta_2-\theta_3$, and more than $\theta_3$. A desired injection pulse commencement time $\theta_s$, which is calculated by the value of the engine speed RPMe and the injection pulse duration Ti, is determined.

In this embodiment, three points $\theta_1-\theta_3$ are selected as the actual commencement time, but the optimum number of such points may be selected, according to an engine. When a desired injection pulse commencement time $\theta_s$ is positioned on a point less than $\theta$ limit ($\theta=1$), $\theta_1$, is selected as the actual commencement time. When the engine is in the idling condition, $\theta$ idle is selected as the actual commencement time. According to the present embodiment, a desired fuel injection pulse timing is divided into three zones, which are $\theta_1-\theta_2, \theta_2-\theta_3$, and $\theta_3-\theta$ idle. The boundary values of the zones are $\theta_1, \theta_2, \theta_3$, and $\theta$ idle. When the desired injection pulse commencement timing $\theta_s$ is positioned in one of the zones, the value of the boundary point which is located on an advanced portion within the specific zone, is selected. $\theta_1$ (= $\theta$ limit) and $\theta$ idle are limit values. When the commencement time $\theta_s$ is positioned on a delayed zone, $\theta_3$ is selected as a desired commencement time of a fuel injection pulse. If the commencement time $\theta_s$ is between $\theta_2$ and $\theta_3$, $\theta_2$ is adopted as the commencement time. Further, if the commencement time $\theta$ is between $\theta_1$ and $\theta_2$, $\theta_1$ is adopted as the commencement time. The data of $\theta_1-\theta_3$ are memorized in the RAM 108. Thus, the commencement time $\theta_s$ is compared with $\theta_1-\theta_3$, and one of $\theta_1-\theta_3$ is selected as the actual commencement time. For example, when the fuel injection pulse duration is Tin, the desired fuel injection pulse commencement time of a point "a" corresponding to the engine speed RPM a, is $\theta$a. The $\theta_a$ is positioned on a delayed zone, in comparison with the point $\theta_3$ whose value is TDC. In this case, the actual fuel injection pulse commencement is done at the timing, $\theta_3$.

Figure 5:
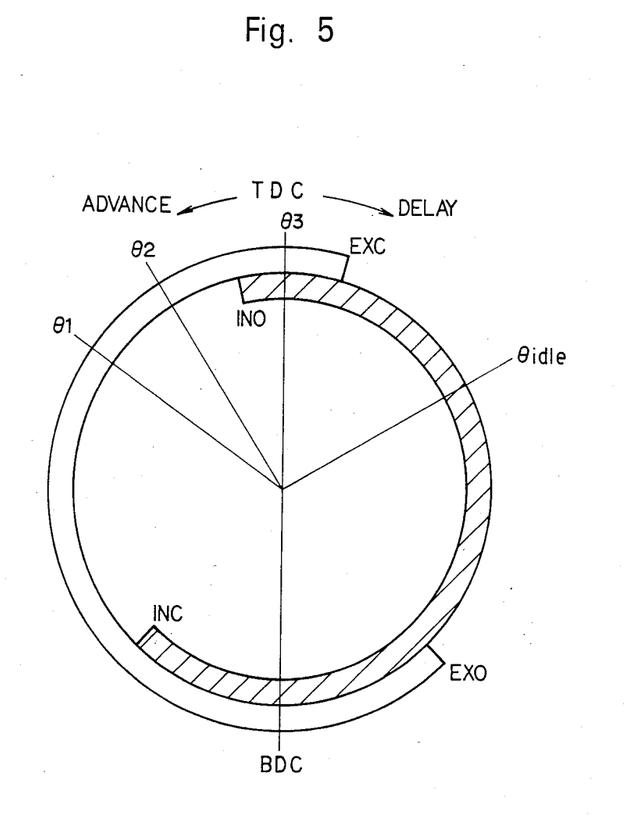
FIG. 5 is a graph illustrating a valve timing of an intake valve and an exhaust valve.

FIG. 5 is a graph illustrating a valve timing of an intake valve and an exhaust valve. TDC designates a top dead center (0°CA). BDC designates a bottom dead center (180°CA). The reference INO designates a timing when the intake valve commences to open. The reference INC is a timing when the intake valve commences to close. The reference EXO is a timing when the exhaust valve commences to open. The reference EXC is a timing when the exhaust valve commences to close, $\theta$idle shown in FIG. 4 is positioned at the outside of the overlapped time when both of the intake valve and the exhaust valve are opened, as shown in FIG. 5. According to the present embodiment, $\theta$ idle is positioned at 60°CA.

Figure 6:
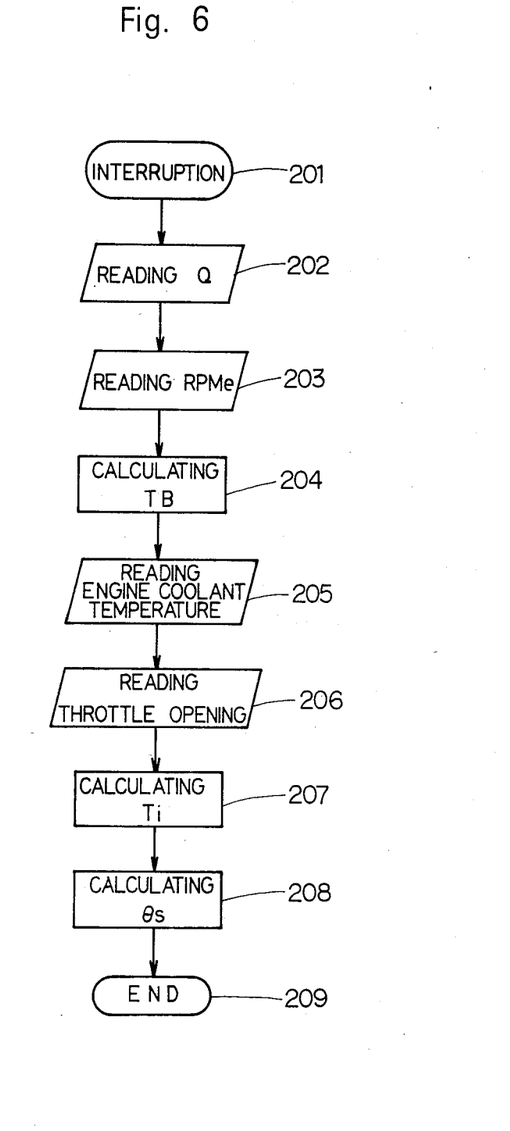
FIG. 6 is a flow chart illustrating operations of the fuel injection timing according to the present invention.

FIG. 6 is a flow chart illustrating operation of the fuel injection timing according to the present embodiment. Step 201 commences to calculate the interruption program, upon the receipt of the output signal of the timing signal generating circuit 103 shown in FIG. 3. In step 202, the amount Q of the introduced air to the air flow meter 3 is read. In step 203, the engine speed RPMe, which is detected by the rotation angle sensor, is read. This read data is memorized in the predetermined area of the RAM 109 by the CPU 106.

In step 204, the CPU 106 calculates a fundamental duration $T_B$ of a fuel injection pulse, based on the data of the Q and the RPMe, by employing the map memorized in the ROM 109. In step 205, the engine coolant temperature detected by the engine coolant temperature sensor 6 is read and is memorized in the predetermined zone of the RAM 108. In step 206, the throttle opening detected by the throttle sensor 5, is read and is memorized in the predetermined zone of the RAM 108.

In step 207, the CPU 106 compensates or adjusts the fundamental duration $T_B$ of the fuel injection pulse, according to the detected parameters of engine coolant temperature and throttle opening and calculates an actual duration of the fuel injection pulse. Further, the injection pulse duration, which is fed into the fuel injection valve 13, is memorized in the predetermined zone of the RAM 108. In step 208, the engine speed RPMe and the injection pulse duration $T_i$ are read from the RAM 108. The desired injection pulse commencement time $\theta_s$ is calculated by the above-described relation (1), the time $\theta_s$ is memorized in the predetermined zone of the RAM 108. In step 209, the routine ends.

Figure 7:
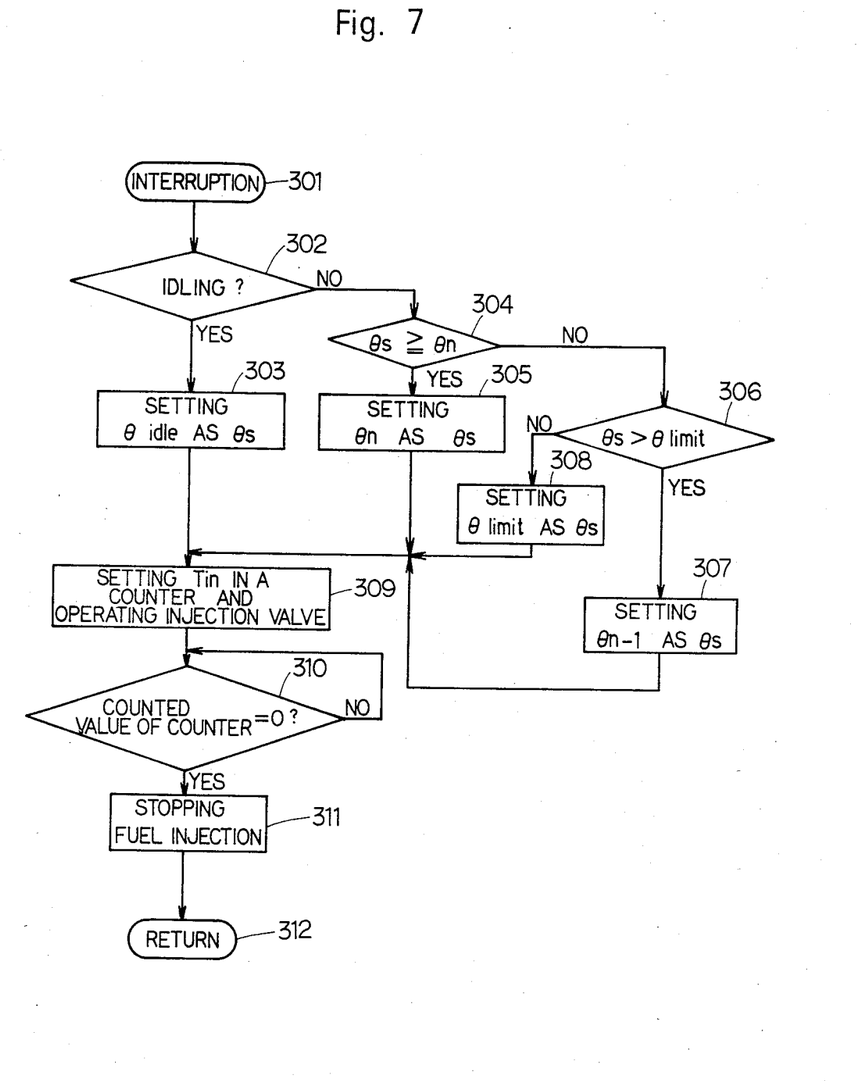
FIG. 7 is a flow chart illustrating operations for injecting fuel according to the present invention.

FIG. 7 is a flow chart illustrating operations for injecting a fuel according to the present embodiment. This flow chart is an interruption routine. In step 301, the interruption routine is commenced. In step 302, it is determined whether the engine is in the idling condition or not. If the engine is in the idling condition, the program proceeds to step 303. In step 303, $\theta$ idle is set to be as the desired injection pulse commencement time $\theta_s$. Contrary to this, if the engine is not in the idling condition, the program proceeds to step 304. In step 304, $\theta_s$ is compared with $\theta_n$ ($n=1,2, \ldots$). If $\theta_s$ is equal to $\theta_2$ or more than $\theta_2$ (for example, $n=2$), the program proceeds to step 305. In step 305, $\theta_2$ is set as $\theta_s$. Contrary to this, if $\theta_s$ is less than $\theta_n$ (for example, $\theta_2$), the program proceeds to step 306. In step 306, $\theta_s$ is compared with $\theta$ limit. If $\theta_s$ is more than $\theta$ limit, the program proceeds to step 307. In step 307, $\theta_{n-1}$ is set as $\theta_s$ (for example, $\theta_3$). If $\theta_s$ is equal to or less than $\theta$ limit, the program proceeds to step 308. In step 308, $\theta$ limit is set as $\theta_s$. Thus, the injection pulse commencement time is set, and the program proceeds from steps 303, 305, 307 and 308 to step 309. In step 309, the injection pulse duration $T_i$ is set in a down counter, and the operation of the injection valve 13 is commenced. The program proceeds to step 310. In step 310, the fuel injection is made until the counted value of the down counter equals zero. When the counted value equals zero, the program proceeds to step 311. In step 311, the fuel injection by the injection valve 13 is stopped. In step 312, the interruption routine is completed.

Thus, according to the present invention, the injection pulse commencement time is not fixed and is adjusted by the driving condition.

While the present invention has been described in its preferred embodiments, it is to be understood that the invention is not limited thereto, and may be otherwise embodied within the scope of the following claims.

What is claimed is:

1. A fuel injection timing control unit for an electronic controlled fuel injection apparatus mounted on an internal combustion engine, comprising:

a first detecting means for detecting an engine speed;

a measuring means for measuring an amount of air introduced into the internal combustion engine;

a second detecting means for detecting at least one parameter which indicates a driving condition of the engine;

a first calculating means for calculating a fundamental duration of a fuel injection pulse from the amount of air introduced into the engine and the engine speed;

a second calculating means for calculating an actual duration of the fuel injection pulse by compensating said fundamental duration of the fuel injection pulse calculated by the first calculating means, said compensating occurring due to said detected at least one parameter;

a third calculating means for calculating an injection pulse commencement timing from said engine speed detected by said first detecting means, said third calculating means adopting said actual duration of the fuel injection pulse calculated by said second calculating means as a parameter;

a memorizing means for memorizing multiple zones of injection pulse commencement timings;

a determining means for determining which zone said injection pulse commencement timing calculated by said third calculating means falls within, the zone being one of said multiple zones memorized in said memorizing means; and a setting means for setting a boundary value of said zone determined by said determining means as an amended injection pulse commencement timing, whereby said internal combustion engine is operated with said amended injection pulse commencement timing and said actual injection pulse duration.

2. The fuel injection timing control unit of claim 1, wherein said second detecting means comprises:

a means for detecting an engine coolant temperature; and a means for detecting an opening of a throttle valve.

3. The fuel injection timing control unit of claim 1, wherein said injection pulse commencement timing is determined in such a condition as said injection pulse commencement timing is a linear function of the engine speed.

4. The fuel injection timing control unit of claim 1, wherein said multiple zones divided for a desired injection pulse, are provided between a desired injection pulse commencement timing in an engine idling condition and a specific limit timing.

5. A fuel injection timing control unit for an electronic controlled fuel injection apparatus mounted on an internal combustion engine, comprising:

a first detecting means for detecting an engine speed;

a measuring means for measuring an amount of air introduced into the internal combustion engine;

a second detecting means for detecting at least one parameter which indicates a driving condition of the engine;

a first calculating means for calculating a fundamental duration of a fuel injection pulse from the amount of air introduced into the engine and the engine speed;

a second calculating means for calculating an actual duration of the fuel injection pulse by compensating said fundamental duration of the fuel injection pulse calculated by the first calculating means, said compensating occurring due to said detected at least one parameter;

a third calculating means for calculating an injection pulse commencement timing from said engine speed detected by said first detecting means, said third calculating means adopting said actual duration of the fuel injection pulse calculated by said second calculating means as a parameter;

a memorizing means for memorizing three zones of injection pulse commencement timing divided by a first boundary value and a second boundary value, the three zones provided between a desired injection pulse commencement timing in an engine idling condition and a specific limit timing;

a determining means for determining which zone said injection pulse commencement timing calculated by said third calculating means falls within; and a setting means for setting an amended injection pulse commencement timing, said setting means adopting said first boundary value when said injection pulse commencement timing calculated by said third calculating means is in a first zone defined between the desired injection pulse commencement timing and said first boundary value, said setting means adopting said injection pulse commencement timing calculated by said third calculating means when said injection pulse commencement timing is in a second zone defined between said first boundary value and said second boundary value, and said setting means adopting said second boundary value when said injection pulse commencement timing is in a third zone defined between said second boundary value and said specific limit timing, whereby said internal combustion engine is operated with said amended injection pulse commencement timing and said actual injection pulse duration.

6. The fuel injection timing control unit of claim 7, wherein said second detecting means comprises:

a means for detecting an engine coolant temperature; and a means for detecting an opening of a throttle valve.

7. The fuel injection timing control unit of claim 7, wherein said injection pulse commencement timing is determined in such a condition as said injection pulse commencement timing is a linear function of the engine speed.

8. A fuel injection timing control unit for an electronic controlled fuel injection apparatus mounted on an internal combustion engine, comprising:

a first detecting means for detecting an engine speed;

a measuring means for measuring an amount of air introduced into the internal combustion engine;

a second detecting means for detecting at least one parameter which indicates a driving condition of the engine;

a first calculating means for calculating a fundamental duration of a fuel injection pulse from the amount of air introduced into the engine and the engine speed;

a second calculating means for calculating an actual duration of the fuel injection pulse by compensating said fundamental duration of the fuel injection pulse calculated by the first calculating means, said compensating occurring due to said detected at least one parameter;

a third calculating means for calculating an injection pulse commencement timing from said engine speed detected by said first detecting means, said third calculating means adopting said actual duration of the fuel injection pulse calculated by said second calculating means as a parameter;

a memorizing means for memorizing three zones of injection pulse commencement timings divided by a first boundary value and a second boundary value, the three zones provided between a desired injection pulse commencement timing in an engine idling condition and a specific limit timing;

a determining means for determining which zone said injection pulse commencement timing calculated by said third calculating means falls within; and a setting means for setting an amended injection pulse commencement timing, said setting means adopting said first boundary value when said injection pulse commencement timing calculated by said third calculating means is in a first zone defined between the desired injection pulse commencement timing and said first boundary value, said setting means adopting said second boundary value when said injection pulse commencement timing calculated by said third calculating means is in a second zone defined between said first boundary value and said second boundary value, and said setting means adopting said specific limit timing when said injection pulse commencement timing calculated by said third calculating means is in a third zone defined between said second boundary value and said specific limit timing.

* * * * *